May 1, 1962  T. J. KEARNEY  3,032,043
ROTARY DRUM DEGREASER
Filed May 13, 1958  5 Sheets-Sheet 5

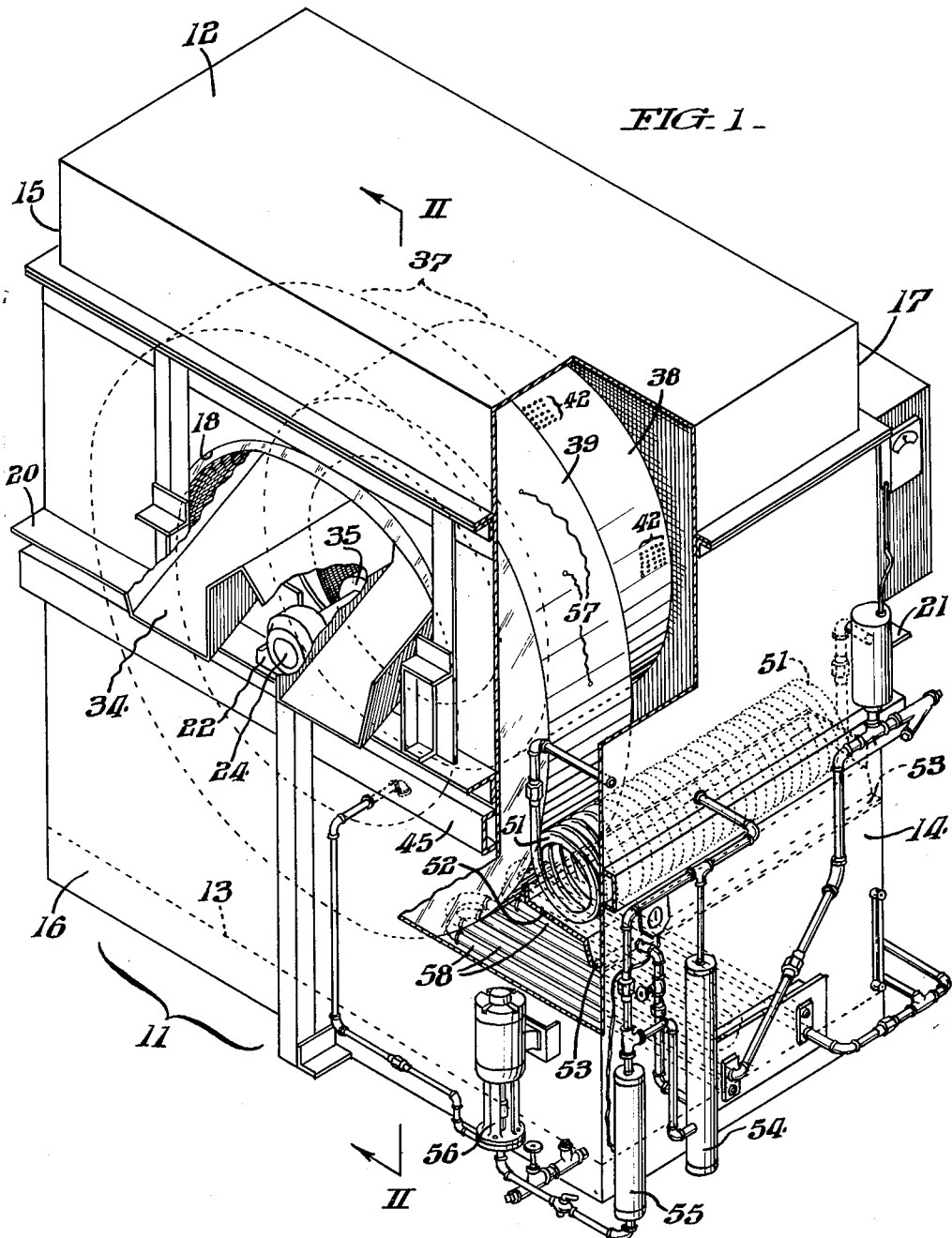

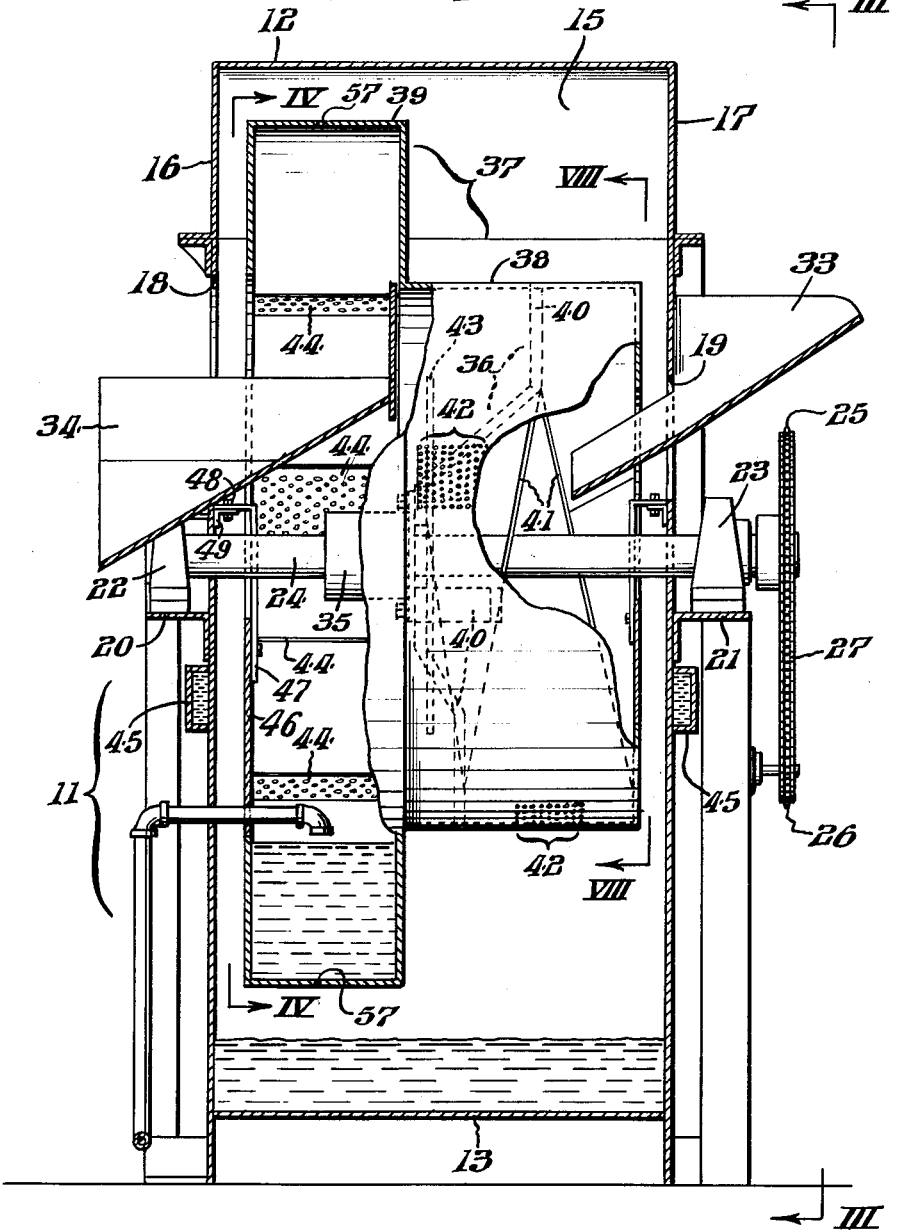

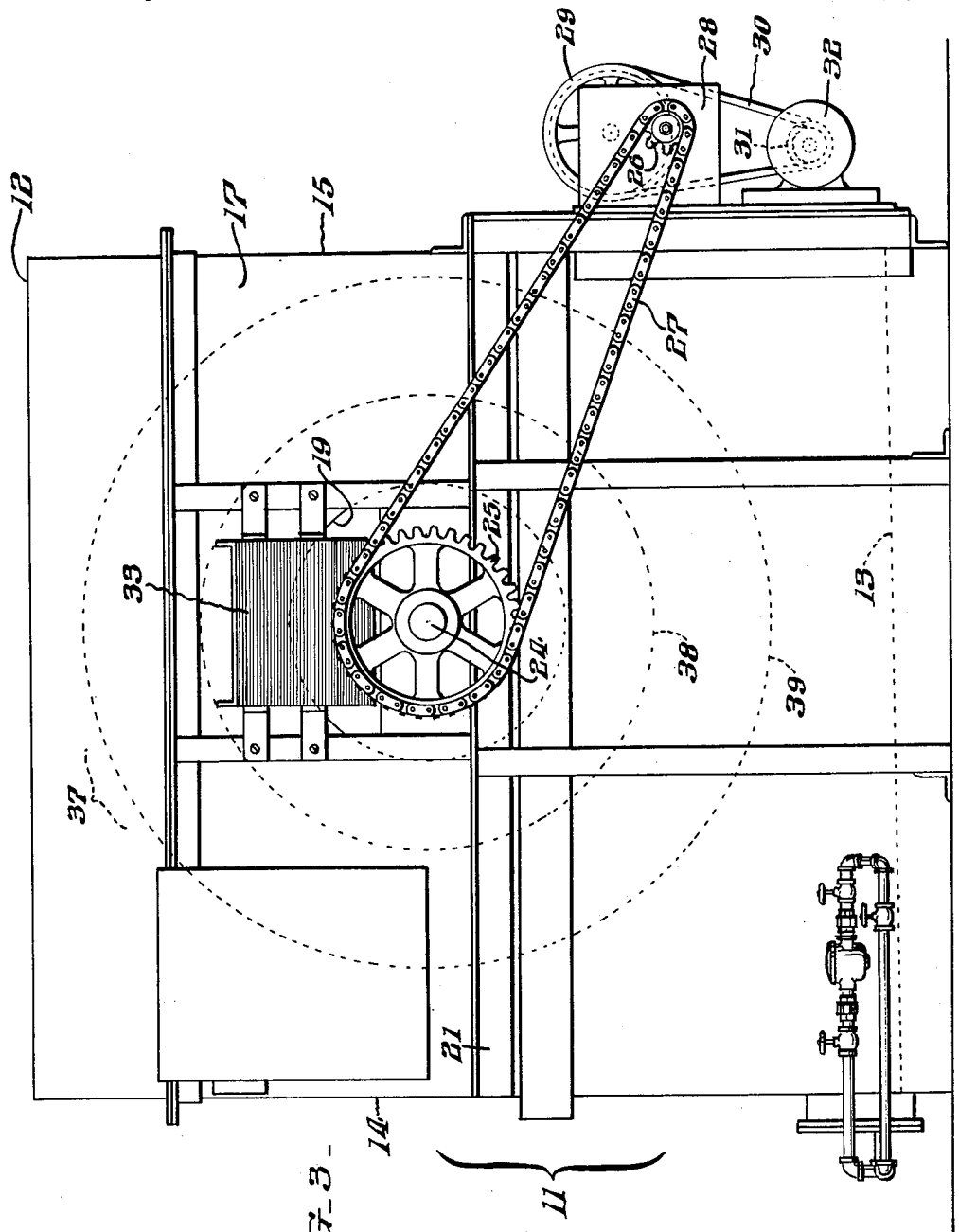

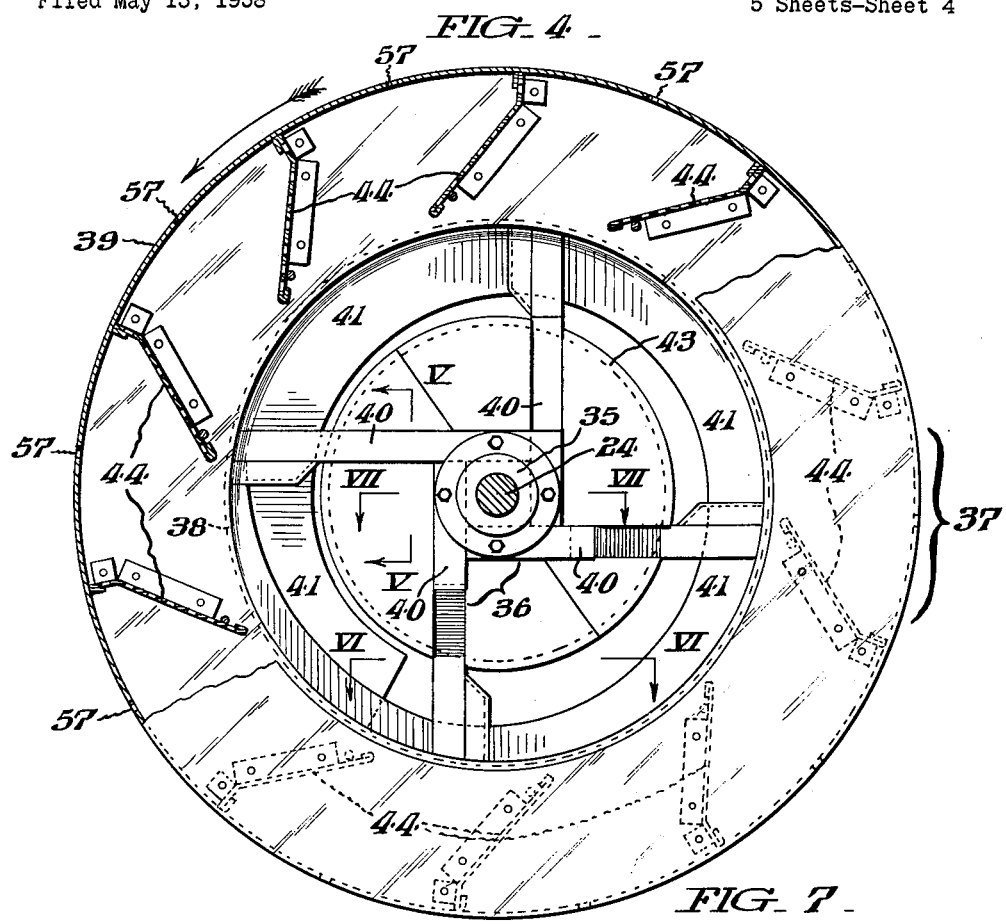

INVENTOR.
*Thomas J. Kearney,*
BY *Paul & Paul*
ATTORNEYS.

United States Patent Office 3,032,043
Patented May 1, 1962

3,032,043
ROTARY DRUM DEGREASER
Thomas J. Kearney, Detroit, Mich., assignor to Detrex Chemical Industries, Inc., a corporation of Michigan
Filed May 13, 1958, Ser. No. 734,970
4 Claims. (Cl. 134—65)

This invention relates to improvements in machines for degreasing a work object, and more particularly concerns a rotary drum degreaser for degreasing a plurality of work objects such as the output devices of screw machines, stamping presses, extrusion presses, and the like.

In the field of degreasing there has always been a demand for a small compact degreaser to clean either a steady flow of small parts or batches of small parts. These parts are usually conveyed to the cleaning apparatus in tote pans. A common size of tote pan used in the trade is 10 inches by 16 inches by 6 inches. To convey these small parts through a degreaser, various types of wire mesh belt, bucket type conveyors, and vibrating conveyors have heretofore been used. One of the disadvantages of such apparatus has been the large amount of floor space they require. Another disadvantage is that such apparatus has been comparatively expensive.

Accordingly, it is an object of this invention to overcome the disadvantages of previous devices.

It is another object of this invention to provide a degreaser which is simple, of low cost, and of compact design so that it easily fits in adjacent to machines which perform various forming operations.

It is another object of this invention to provide a degreaser which degreases the output devices of such machines as screw machines, stamping presses, extrusion presses, and the like.

It is another object to provide a degreaser which degreases articles as they come from the machining or forming operation, and degreases such articles without intermediate handling between the machining or forming operation and the degreasing operation.

It is another object of this invention to provide a degreaser which is small and compact and which easily cleans the contents of the tote boxes commonly used in factories.

It is another object of this invention to provide a degreaser which degreases parts which are normally rather difficult to handle in automated equipment, such parts as nails, self-tapped metal screws, wood screws, and the like. The fine point of such parts are apt to enter holes of any perceptible size and become stuck at this point in the degreasing process; it is an object of this invention to prevent this from happening.

Other objects and advantages of the invention will further become apparent hereinafter and in the drawings, in which:

FIG. 1 represents a perspective view of the apparatus constructed in accordance with my invention;

FIG. 2 represents a sectional view in elevation of the apparatus of FIG. 1 taken along the line and in the direction of the arrows II—II of FIG. 1;

FIG. 3 represents a rear elevational view of the apparatus of FIG. 1 taken in the direction of the arrows III—III of FIG. 2;

FIG. 4 represents a sectional elevational view taken along the line and in the direction of the arrows IV—IV of FIG. 2;

FIG. 5 represents a fragmentary sectional view taken along the lines and in the direction of the arrows V—V of FIG. 4;

FIG. 6 is a fragmentary sectional view taken along the lines and in the direction of the arrows VI—VI of FIG. 4;

FIG. 7 represents a fragmentary sectional view taken along the line and in the direction of the arrows VII—VII of FIG. 4;

Figure 8:
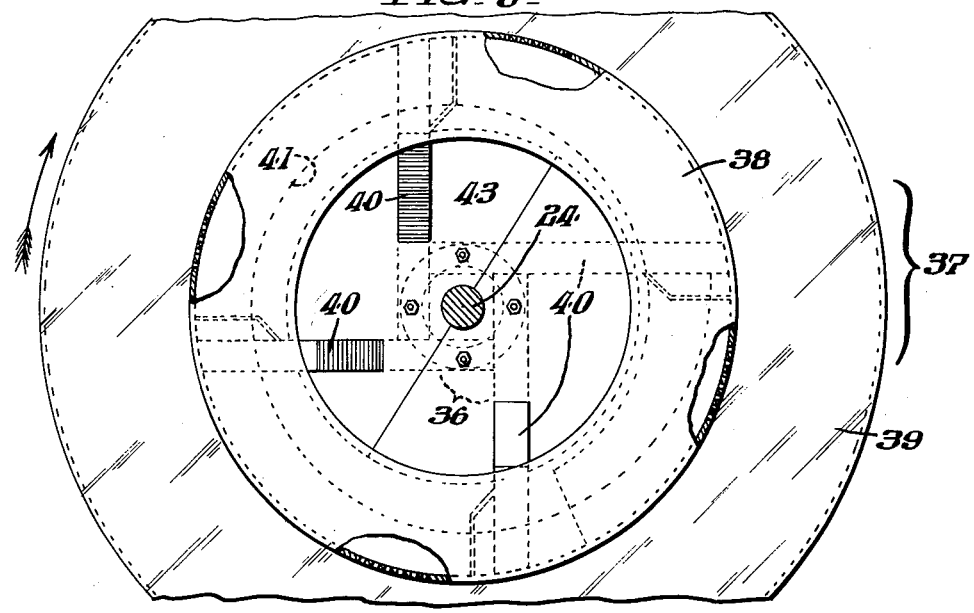
FIG. 8 is a fragmentary sectional view taken along the line and in the direction of the arrows VIII—VIII of FIG. 2, portions thereof being broken away.

Although specific terms are used in the following description for the sake of clarity, these terms are intended to refer only to the structure shown in the drawings and are not intended to define or limit the scope of the invention.

Turning now to the specific embodiment of the invention selected for illustration, the number 11 designates an impervious housing which is formed by top wall 12, bottom wall 13, side walls 14, 15, front wall 16 and rear wall 17. Housing 11 forms a well containing a degreasing solvent which is preferably a chlorinated hydrocarbon such as trichlorethylene.

Front wall 16 has formed therein an opening 18, and likewise rear wall 17 has formed therein an opening 19. Supporting angles 20, 21 are affixed horizontally to the outside face of walls 16 and 17 respectively. Pillow blocks 22, 23 are mounted on angles 20, 21 respectively and centrally of openings 18 and 19. Shaft 24 is rotatively journaled in pillow blocks 22, 23, said shaft extending all the way through the interior of housing 11. As can be seen from FIGS. 2 and 3, sprocket 25 is keyed to the end of shaft 24 which extends beyond the rear wall of housing 11. Sprocket 25 is drivingly connected to sprocket 26 by roller chain 27. Sprocket 26 is keyed to the output shaft of gear reducer 28, the corresponding input shaft having keyed thereto the belt pulley 29. Belt 30 provides a driving connection between pulley 29 and sheave 31 which is in turn keyed to the output shaft of drive motor 32, said motor being affixed to housing 11.

Load chute 33 is affixed to the rear wall 17 of housing 11, its forward end protruding through opening 19 into the interior of said housing. Unload chute 34 is affixed to front wall 16 of housing 11 and extends rearwardly into the interior thereof.

Hub 35 is keyed to shaft 24 and has bolted thereto spider 36. Double diameter drum 37 is fixedly mounted to the arms 40 of spider 36. Drum 37 consists of smaller diameter section 38 and larger diameter section 39. Helical flights 41 are affixed to the inside surface of smaller diameter section 38. The surface of smaller diameter section 38 contains therein a plurality of foraminous areas 42. Work deflector plate 43, having a diameter less than that of smaller diameter portion 38 is affixed to shaft 24 and has its plane surface oriented normal thereto. Plate 43 is spaced axially on shaft 24 so as to be slightly to the rear of the rear wall of larger diameter portion 39. A plurality of foraminous buckets 44 are spaced equi-distantly along the inner surface of larger diameter portion 39. Water jacket 45 is affixed to the outside walls of housing 11 and is mounted horizontally thereon at a level below the axis of shaft 24. Referring to FIG. 2, a drum closure segment 46 is mounted within the lower portion of the front opening of the larger diameter section 39 by means of an angle brace 47, which is in turn affixed to front wall 16 by a bolt 48 and angle iron 49. As thus mounted, the drum closure segment 46 blocks the opening of the larger diameter section 39 against the parts being cleaned during periods of drum rotation, yet does not interfere with such rotation.

*Solvent Recovery and Supply*

A solvent recovery and supply system is associated with the rotary drum degreaser of this invention. Solvent condenser coil 51 is mounted horizontally in close proximity to side wall 14. Condenser pan 52 is mounted below condenser coil 51 and has formed therein trough 53. Piping leads from trough 53 to a water separator 54 through piping to a condensate receiver 55. Piping leads from receiver 55 to motor driving pump 56 through piping which discharges within housing 11.

The periphery of the larger diameter section of drum 37 is formed of solid metal except for a series of weep holes 57. Steam coil 58 is located within housing 11 and in close proximity to bottom wall 13.

Solvent System

Solvent vapor for use in the rotary drum degreaser is generated by steam coil 58 as the solvent in the bottom of housnig 11 is heated, these vapors rising to the height of water jacket condenser 45, which is the normal height of the solvent vapors within the degreaser. These vapors are held at this level by water jacket condenser 45 which completely encircles the degreaser and condenser coil 51. The solvent vapors condense continuously over the cooled surface of condenser coil 51 and are collected in condensate pan 52, conducted into trough 53 and by means of piping to water separator 54, through piping to condensate receiver 55. The condensate is then transferred through piping to pump 56 and through additional piping, thereby allowing the distillate to be pumped into the buckets formed by the side of the larger diameter section 39 of drum 37. Weep holes 57 are provided to allow for complete drainage of the degreasing unit of this invention at the end of a work period.

The normal rate of distillation is such that pure distillate constantly overflows the inner diameter of the larger diameter section 39 and returns to the vapor generating sump, thus completing the solvent cycle.

Figure 9:
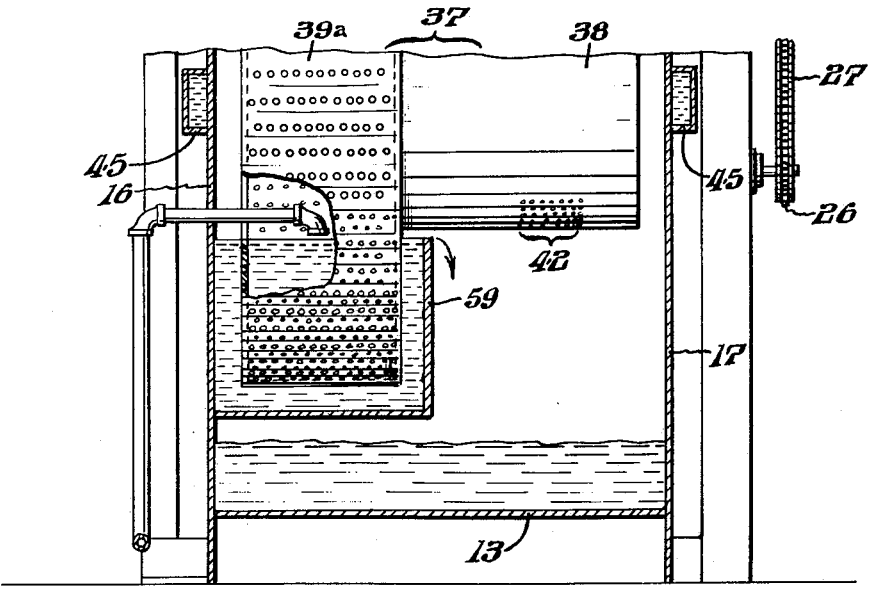
FIG. 9 is a side elevational section of apparatus constructed in accordance with a modification of this invention.

In the modification of this invention shown in FIG. 9, the peripheral surface of a larger diameter section 39a is constructed of foraminous material. Such construction includes a well portion 59 which is located above the surface of the condensate sump, and which retains solvent distillate for rinsing the parts when they are within larger diameter section 39a. This solvent may be supplied either by means of pump 56 or by piping direct from condensate pan 52. The solvent from well 59 overflows and returns to the vapor generating sump and thereby provides a continuous solvent cycle.

Operation

The parts to be cleaned are loaded into the degreaser through load chute 33. The parts travel down chute 33 and fall into the smaller diameter drum section 38 of the revolving drum 37. As the drum 37 revolves, the parts are passed forwardly along the axis of the drum 37 by the action of flights 41 which force the parts in the direction toward larger diameter drum section 39. While within smaller diameter drum section 38, the parts are subjected to vapor cleaning through the condensing of hot solvent vapors upon the parts which are at room temperature. The oils and greases removed by the solvent vapor from the parts are emptied from smaller diameter drum section 38 through the foraminous areas 42, through which the solvent-oil mixture passes to the heated sump of the degreaser. As drum 37 revolves, the parts then move forwardly and fall into the larger diameter drum section 39 which has its lower portion filled with distilled liquid solvent into which the parts fall and are subjected to a liquid solvent rinse. This liquid solvent is constantly overflowing from the larger diameter drum section 39 to the heated sump of the degreaser. Inside the larger diameter drum section 39, the spaced buckets 44 pick up the parts as drum 37 revolves, and lift them from bottom dead center to top dead center where the parts are discharged and fall by gravity into the unload chute 34. As the parts move from bottom dead center to top dead center, the parts are lifted out of the liquid rinse and passed through a vapor zone where they are subjected to a final vapor rinse and are heated to the vapor temperature. The parts are then conducted up to the top dead center position where they are discharged through unload chute 34, free of oils and greases, and dry.

Work deflector plate 43 prevents the parts from entering drum 37 through load chute 33 at a speed so great as to shorten the cleaning cycle. Deflector plate 43 insures that the parts to be cleaned are deflected into smaller diameter drum section 38 and subjected to a vapor cleaning cycle before entering the larger diameter drum section 39 and being subjected to a liquid cleaning cycle.

The apparatus of this invention is simple and compact and provides for degreasing the parts in batches or in a continuous flow of work.

The above described rotary drum degreaser does not require a large amount of floor space and is comparatively inexpensive. It is of simple compact design so that it easily fits in adjacent to machines which perform various forming operations, and it degreases the articles coming from machining or forming operations without intermediate handling between the machining or forming operation and the degreasing operation. The rotary degreaser of this invention easily degreases the output devices of such machines as screw machines, stamping presses, extrusion presses, and the like, and is especially adapted for cleaning the contents of tote boxes commonly used in factories.

Notice that the periphery of double drum 37 is fabricated of substantially solid metal in the embodiment of FIG. 2 so that drum 37 is adapted to handle parts normally rather difficult to handle in automated equipment. In equipment heretofore proposed, the fine points of nails, self-tapped metal screws, wood screws, and the like, have entered into holes in the equipment which were of perceptible size, and this caused the parts to become stuck at this point in the cycle of the automated equipment. This source of trouble is eliminated in the rotary drum degreaser of this invention.

Another advantage of the apparatus of this invention is that solvent vapor loss is restricted to a minimum amount by means of the water jacket condenser 45 and condenser coil 51, thereby providing improved working conditions. A further advantage is that few working parts are required in the degreaser constructed according to this invention.

Apparatus constructed in accordance with this invention has functioned so as to handle five cubic feet of work objects per hour, at a rated capacity of 2000 pounds of steel or brass per hour.

It is to be understood that the form of the invention herewith shown and described is to be taken as a preferred embodiment. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims.

Having thus described my invention, I claim:

1. A rotary drum degreaser for degreasing a plurality of work objects comprising a housing, a well within the housing for containing a solvent, means contained in said well for vaporizing the solvent, and a horizontal rotary drum mounted within the housing, said drum having a vapor section and a liquid section, means within said vapor section to restrain the flow of work objects therethrough, said liquid section being of larger diameter than said vapor section, means mounted within said drum for advancing said work objects first, through said vapor section, then through said liquid, and means delivering liquid solvent to said liquid section wherein said liquid solvent is retained to rinse said work objects.

2. A rotary drum degreaser for degreasing a plurality of work objects comprising a housing, a well within the housing for containing a solvent, means for vaporizing said solvent, and a rotary drum having a substantially horizontal axis of rotation mounted within the housing, said drum having a vapor section and a liquid section, said liquid section being of larger diameter than said vapor section, said vapor section being constructed of solid material except for a foraminous drainage area, said foraminous area rejecting passage of said work objects, means mounted within said drum for advancing said work objects first through said vapor section, then through said liquid section and finally out of said drum and means delivering liquid solvent to said liquid section wherein said liquid solvent is retained to rinse said work objects.

3. A rotary drum degreaser for degreasing a plurality of work objects comprising a housing, the sides and bottom of said housing forming a first well within the housing, said first well adapted to contain a solvent, means disposed within said first well for vaporizing said solvent and a rotary drum mounted within the housing, said drum having a vapor section and a liquid section, said liquid section being of larger diameter than said vapor section, said liquid section being constructed of foraminous material and being submerged in a second well of liquid solvent, said second well being formed integrally with the housing and separately from said first well and means delivering liquid solvent to said second well and for causing said liquid solvent to overflow into said first-mentioned well.

4. The rotary degreaser for degreasing a plurality of work objects, comprising a housing, a well within the housing adapted to contain a boiling liquid solvent, a rotary drum of double-diameter mounted within the housing above the level of said liquid solvent, said drum having a vapor solvent section and a liquid solvent section with the vapor section being of smaller diameter than the liquid section, drive means for rotating said drum, means for condensing said vapor solvent to liquid solvent and delivering it to said liquid drum section, a load chute mounted on said housing for delivering parts to be cleaned to said vapor drum section, a deflector plate mounted within said vapor drum section for preventing the parts from passing too quickly into said liquid drum section, a helical flight positioned within said vapor drum section for moving the parts through said vapor drum section, a series of radially spaced buckets positioned on the periphery of said liquid drum section for moving said parts through the liquid solvent in said liquid drum section and through the solvent vapor located above said liquid solvent, and an unload chute mounted on said housing at the top of the rotational path of said liquid drum section for receiving the cleaned parts and discharging them from the rotary degreaser.

References Cited in the file of this patent
UNITED STATES PATENTS

| | | |
|---|---|---|
| 1,422,309 | Schweinsberg | July 11, 1922 |
| 2,089,102 | Savage | Aug. 3, 1937 |
| 2,191,255 | Bonotto | Feb. 20, 1940 |
| 2,314,871 | De Back | Mar. 30, 1943 |
| 2,571,581 | Kearney | Oct. 16, 1951 |

UNITED STATES PATENT OFFICE
CERTIFICATE OF CORRECTION

Patent No. 3,032,043                                                May 1, 1962

Thomas J. Kearney

It is hereby certified that error appears in the above numbered patent requiring correction and that the said Letters Patent should read as corrected below.

Column 3, line 6, for "driving" read -- driven --; line 16, for "housnig" read -- housing --.

Signed and sealed this 4th day of September 1962.

(SEAL)
Attest:

ERNEST W. SWIDER                                 DAVID L. LADD
Attesting Officer                                      Commissioner of Patents